US 9,251,292 B2

(12) United States Patent
Cheng et al.

(10) Patent No.: US 9,251,292 B2
(45) Date of Patent: Feb. 2, 2016

(54) SEARCH RESULT RANKING USING QUERY CLUSTERING (71) Applicant: Wal-Mart Stores, Inc., Bentonville, AR (US)

(72) Inventors: Jinxing Cheng, Palo Alto, CA (US); Abhishek Gattani, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 279 days.

(21) Appl. No.: 13/794,349

(22) Filed: Mar. 11, 2013

(65) Prior Publication Data

US 2014/0258330 A1 Sep. 11, 2014

(51) Int. Cl.
*G06F 17/30* (2006.01)

(52) U.S. Cl.
CPC ...... *G06F 17/30979* (2013.01); *G06F 17/3069* (2013.01); *G06F 17/30646* (2013.01); *G06F 17/30705* (2013.01)

(58) Field of Classification Search
CPC .......... G06F 17/30979; G06F 17/30705; G06F 17/30646; G06F 17/3069
USPC .......... 707/771, 710, 741
See application file for complete search history.

(56) References Cited

U.S. PATENT DOCUMENTS

| | | | |
|---|---|---|---|
| 5,926,811 A | 7/1999 | Miller | |
| 6,711,563 B1 | 3/2004 | Koskas | |
| 6,853,996 B1 | 2/2005 | Chen | |
| 7,062,487 B1 | 6/2006 | Nagaishi | |
| 7,672,833 B2 | 3/2010 | Blume | |
| 7,971,150 B2 | 6/2011 | Raskutti | |
| 7,983,963 B2 | 7/2011 | Byrne | |
| 8,346,795 B2 | 1/2013 | Roulland | |
| 8,694,529 B1 * | 4/2014 | Hotchkies et al. | 707/766 |
| 2012/0036148 A1 * | 2/2012 | Jain et al. | 707/769 |

OTHER PUBLICATIONS

Wu et al.; "Learning Query and Document Similarities from Click-through Bipartite Graph with Metadaa"; Microsoft Reasearch Technical Report; Nov. 18, 2011; 22 pages.*

* cited by examiner

*Primary Examiner* — Monica Pyo
(74) *Attorney, Agent, or Firm* — Bryan Cave LLP (57) ABSTRACT Systems and methods are disclosed herein for providing search results, particularly product records from a product database. Past queries are analyzed and grouped into clusters according to similarities, with each query including a highly relevant head query and a plurality of tail queries. Similarity of queries may be determined based on user response similarity to query results, co-occurrence, and textual similarity. One or more categories are identified for the clusters, such as based on click-through rates for search results of the head queries of the clusters. Upon receiving a query, a cluster for the query is identified, such as according to similarity to one or more queries of the cluster. The categories associated with the cluster are then used to one or both of augment the query and rank search results for the query.

14 Claims, 7 Drawing Sheets

SEARCH RESULT RANKING USING QUERY CLUSTERING

BACKGROUND

1. Field of the Invention

This invention relates to systems and methods for responding to search queries, and, more particularly, to searches for products in a product database.

2. Background of the Invention

It is the goal of many online retailers to be a one-stop-shop for customers. Accordingly, the retailer may have a very large array of products. In order to better meet the needs of customers, many retailers also integrate products of other merchants into their websites, further increasing the number of products available. With so many products offered for sale, it can be difficult for a customer to find a desired product through a search. Many retailers offer free-form text searches of their product databases. However, the large number of products available provides many opportunities for matching but irrelevant products.

Accordingly, it would be an advancement in the art to provide an improved approach to performing product-based searches that increases the relevance of search results to a user.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
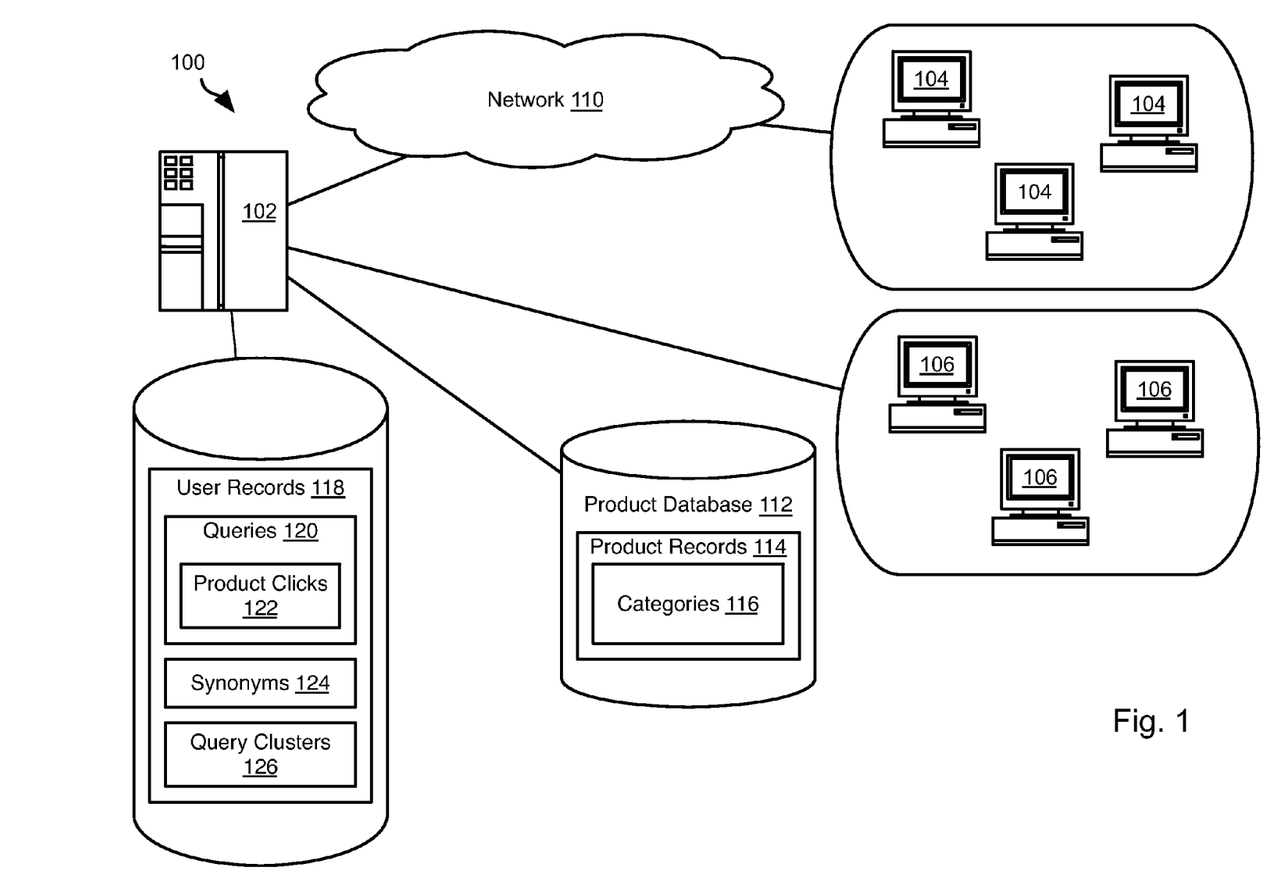
FIG. 1 is a schematic block diagram of a system for performing methods in accordance with embodiments of the present invention.

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more merchant workstations 104 and one or more customer workstations 106. In the methods disclosed herein, the merchant workstations 104 and customer workstations 106 may be embodied as mobile devices such as desktop computers or other computing device such as a mobile phone or tablet computer.

In some embodiments, some or all of the methods disclosed herein may be performed using a desktop computer or any other computing device as the merchant workstations 104 and customer workstations 106. For purposes of this disclosure, discussion of communication with a user or entity or activity performed by the user or entity (e.g. analyst, crowdsourcing community, merchant) may be interpreted as communication with a computer 104, 106 associated with the user or entity or activity taking place on a computer associated with the user or entity. The merchant workstations 104 may be viewed as a merchant computer network 104 whereby tasks to be performed by a merchant representative may be performed by any member of the population by means of logic implemented by the computer network, the server system 102, or some other entity.

Some or all of the server 102, merchant computers 104, and customer workstations may communicate with one another by means of a network 110. The network 110 may be embodied as a peer-to-peer connection between devices, a connection through a local area network (LAN), WiFi network, the Internet, or any other communication medium or system. Each of the populations 104, 106 of workstations may be coupled to one another by separate networks some or all of the three populations 104, 106 of workstations may share a common network. For example, in the illustrated embodiments, the merchant workstations and server system 102 may communicate over a separate private network, rather than over the network 110.

The server system 102 may be associated with a merchant, or other entity, providing search services. For example, the server system 102 may host a search engine or a site hosted by a merchant to provide access to information about products and user opinions about products. For example, the server system may host or access a product database 112 storing a plurality of product records 114. The product records 114 may have one or more categories 116 associated therewith. For example, the product records 114 may be leafs nodes of a taxonomy including nodes representing product categories and subcategories. Accordingly, the categories 116 for a product record may be associated with the product due to its position in the taxonomy or due to a path describing categories and subcategories to which the product belongs stored as part of the product record 114.

The method described herein may make use of data known about an individual user when responding to user queries. Accordingly, the server system 102 may host or access a database of user records 118 for a plurality of users that have submitted queries to the server system 102 or otherwise provided data to a merchant that can be used in responding to subsequent queries. For example, queries may be submitted by users from the user workstations 106.

The user record 118 for a particular user may include queries 120 previously submitted by the user associated with the user record 118. A query 120 may include text including one or more words, numbers, or combination thereof, or any other data structure or object that can be used to locate or identify a product or category of products. Each query 120 may have associated therewith one or more product clicks 122 identifying products selected by the user from among the search results for the query 120. In some embodiments, a query 120 may also be recorded therefore a number of time a user or collection of users have entered that query 120 and performed a search based thereon.

As will be described in greater detail below, synonyms 124 may be mined from user queries 120 and product clicks 122 and associated with the user record 118. Queries may also be clustered according to methods described herein and these clusters 126 may then be used in order to identify relevant responses to user queries. In some embodiments, the queries 120, product clicks 122 of queries, synonyms 124, and query clusters 126 are not specific user and therefore are not part of a particular user record 118.

Figure 2:
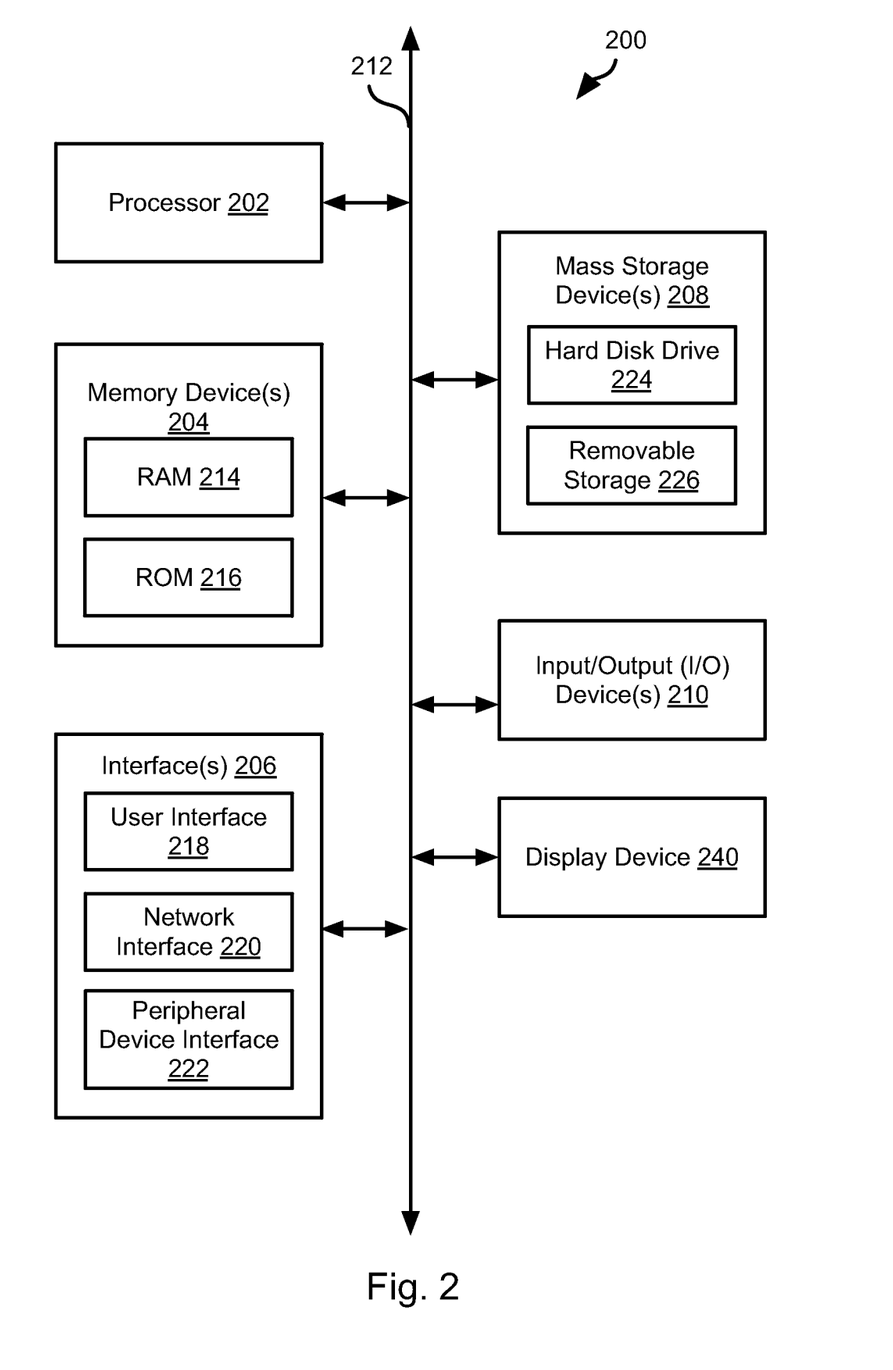
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, merchant workstation 104, and customer workstation 106, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more non-transitory mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
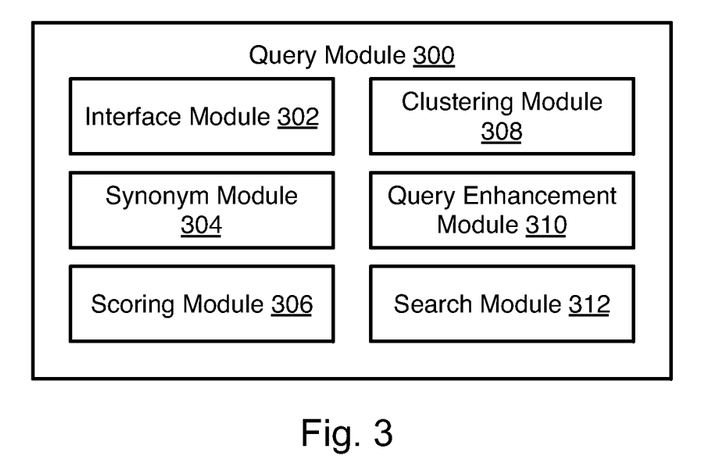
FIG. 3 is a schematic block diagram of modules implementing methods in accordance with embodiments of the present invention.

FIG. 3 illustrates a query module 300 including software and/or hardware modules implementing classification methods disclosed herein. In some embodiments, the modules and data of the query module 300 are implemented or accessed by the server system 102 or some other entity that provides an interface to the server system 102.

The query module 300 may include an interface module 302 for receiving queries and transmitting responses to queries to a requesting entity. The query module 300 may be part of a data flow such that a query input to the query module 300 is not received directly from, for example, the customer workstation 106. For example, a query may be expanded or otherwise modified to include keywords associated with concepts identified in the query. The query may also be generated by some other software module executed by the server system 102. Whichever entity originated a query received by the interface module 302, the interface module 302 may route the search results to this requesting entity or to some other entity specified with the query.

The query module 300 may include a synonym module 304. In many cases synonyms are known and databases of synonyms are readily used to associated synonyms with the same concept. In some embodiments, synonyms are not readily apparent, such as for colloquial terms for products or types of products. Accordingly, synonym module 304 may identify synonyms according among the terms of queries and based on responses to search results for different queries as will be described in greater detail below.

A scoring module 306 scores queries relative to one another in order to characterize the similarity between queries. The method implemented to score queries relative to one another is described in greater detail hereinbelow. The clustering module 308 identifies clusters among the queries for use in responding to queries according to methods described hereinbelow. An example method by which the clustering module 308 groups queries into clusters is also described hereinbelow.

The query enhancement module 310 uses clusters defined according to the clustering module 310 to modify a query and/or process search results of a query in order to better identify documents, such as product records, relevant to the received query. As will be described in greater detail below, the query enhancement module 310 may be operable to identify categories that are likely of interest to the author of the received query based on one or more categories associated with a cluster of queries related to the received query.

In some embodiments, data obtained from query clusters relevant to a received query is used to rank or otherwise filter or sort search results for the query. Accordingly, a search module 312 may search a corpus of documents, such as a database of product records, websites accessible over the Internet, or other corpus and return results relevant to a particular query. The search module 312 may implement any search algorithm, e.g. search engine, known in the art for identifying documents relevant to a query, from a simple keyword matching search to a more complex search with word sense disambiguation, contextual searching, or other strategy for identifying relevant documents.

Figure 4:
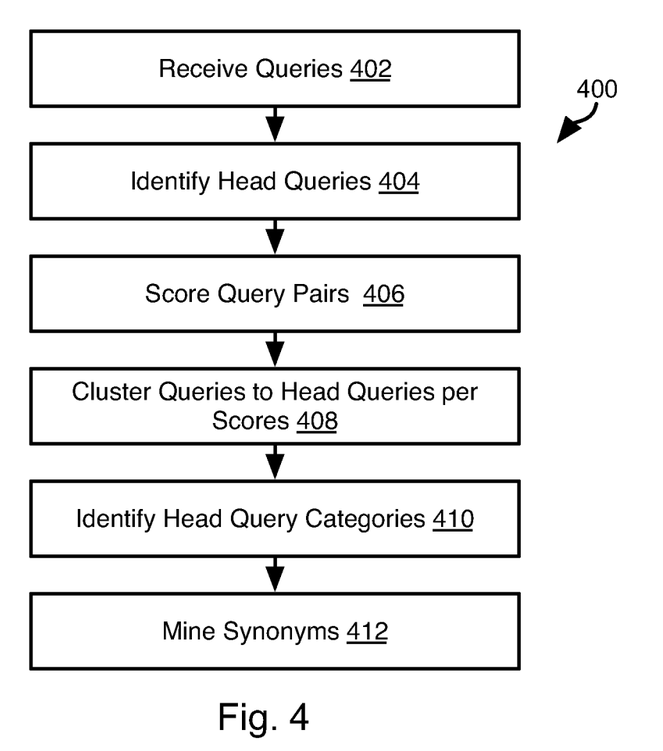
FIG. 4 is a process flow diagram of a method for clustering queries for a user in accordance with an embodiment of the present invention.

Referring to FIG. 4, a method 400 may be executed with respect to a plurality of queries. The method 400 may be executed by a server system 102 or executed elsewhere with an interface provided to the server system 102. The method 400 may be executed for a collection of queries and user responses to the search results thereof. The collection of queries may be queries authored by a single user, a group of users belonging to a common demographic group or other common interest or attribute, or users in general without any unifying attributes. The collection of queries may include at least a portion of all queries received over time by a server system 102 from any of these authors or queries for any of these authors provided to the server system 102.

The method 400 includes receiving 402 a collection of queries and identifying 404 a plurality of head queries. A head query may include a query that is most relevant to the author or authors of the collection of queries. For example, the top N queries that have the highest number of impressions may be identified 404 as the head queries. Impressions for a query may include a number of times an author or authors of the collection of queries have entered the query and performed a search using the query.

The method 400 may further include scoring pairs of queries of the collection of queries with respect to one another. In some embodiments, scores are calculated for pairs of queries including at least one head query and a secondary query (a query of the collection of queries other than the head queries). In other embodiments, scores may be calculated for pairs of queries including two secondary queries and/or two head queries. Scoring a pair of queries may include calculating a similarity between the queries. An example method for characterizing the similarity between two queries is described in greater detail below with respect to FIG. 6.

Using the scores calculated 406 for query pairs, the secondary queries are clustered 408 to at least one head query. In one embodiment, a secondary query is clustered 408 to only one head query. Various clustering techniques known in the art may be used to perform the clustering 408, such as k-means clustering, k-medians clustering, k-medoid clustering, other centroid clustering model, or other clustering technique. The value of k used for the clustering algorithm may be chosen to be equal to the number of head queries selected. The clustering step 408 may have as an optimization goal the assignment of each secondary query to the head query to which the secondary query has the largest similarity score. A secondary query associated with a head query may be referred to as a tail query of that head query.

In an alternative embodiment, the clustering 408 step is performed without regard to head queries and the queries of the collections are grouped into clusters according to a clustering algorithm having as an optimization goal adding each query to a cluster such that the mean similarity score of the query with respect to the other queries of the cluster is as small as possible. A head query may be identified for each cluster by selecting the query with the highest number of impressions.

As will be described in greater detail below, the categories associated with a head query may be used to enhance query results. Accordingly, in preparation for subsequent use of the query clusters, categories associated with the head queries may be identified 410. The categories associated with a query may include categories associated with product records returned for the query in past searches and which were selected (e.g. clicked on) by a user. An example method for associating categories with a head query is described in greater detail with respect to FIG. 5.

In some embodiments, synonyms may be used to relate queries to one or both of head queries and tail queries thereof in order to identify clusters related to a query. Accordingly, the head and tail queries of the clusters may be mined 412 to identify synonyms. And groups of two or more words found to be synonymous may be stored for later use with respect to queries in which one of the two or more words occur. A method for mining synonyms is described below with respect to FIG. 9.

Figure 5:
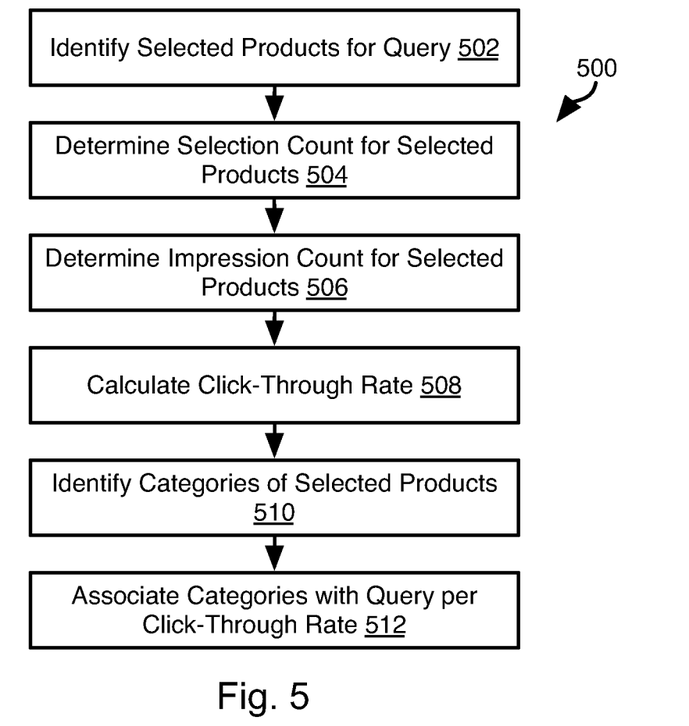
FIG. 5 is a process flow diagram of a method for associating categories with a query cluster in accordance with an embodiment of the present invention.

FIG. 5 illustrates a method 500 for identifying categories associated with a head query. The method 500 may be executed with respect to a query and take as additional inputs query results for various times in which the query has been input and user selections for the query results. The methods herein are particularly advantageously used with respect to product records that are associated with one or more nodes of a taxonomy representing categories and subcategories to which the product records belong. However, any document having one or more categories associated therewith or sufficient text to infer an associated category may also be processed in the same manner as product records as described herein.

The method 500 may include identifying 502 product records selected for the one or more instances in which the query was input by a user or any of a number of users. For these product records, a selection count may be determined 504 or retrieved. The selection count may include a count of a number of times the product record was selected for the query that is the subject of the method 500. In some embodiments, the selection count may include a count of a number of times the product record was selected from among search results for any query.

The impression count 506 for the identified 502 products may also be determined 506 or retrieved. An impression count for a product record may be the number of times the product record was included in search results for the query that is the subject of the method 500. In some embodiments, the impression count for a product record only counts as an impressions instances when the product record was included in the search result and was actually viewed by a user, e.g. transmitted as part of a web page rendered on a display device on a customer computing device 106 or other document representing the search results. The impression count determined 506 or retrieved at step 506 may include an impression count for the product record including a number of times the product record was included in search results for queries other than the query that is the subject of the method 500.

A click-through rate for the identified 502 product records may then be calculated 508 based on the determined 504 number of selections (e.g. clicks) and the determined 506 impression count. In a simple case, the click-through rate for the product record is proportional to the selection count divided by the impression count.

Categories may then be associated 512 with the query that is the subject of the method 500. For example, the top N identified 502 product records with the highest click-through rate may be evaluated to identify 610 categories associated therewith and these categories may be selected as the categories for the query. In some embodiments, the top M categories that occur most frequently among the top N product records are selected as the categories for the query. Where the product records are associated with a taxonomy, the categories of the product records may be ancestor nodes (e.g. categories and subcategories) of the product records in the taxonomy. Categories for a product record, or other document, may also be determined based on an explicit listing of such categories or by inferring categories based on the content of the product record. In some embodiments, click-through rates for product records may be known, such as by performing steps 504-510, at some point prior to receiving invocation of the method 500, such that only step 512 is performed post-invocation.

Figure 6:
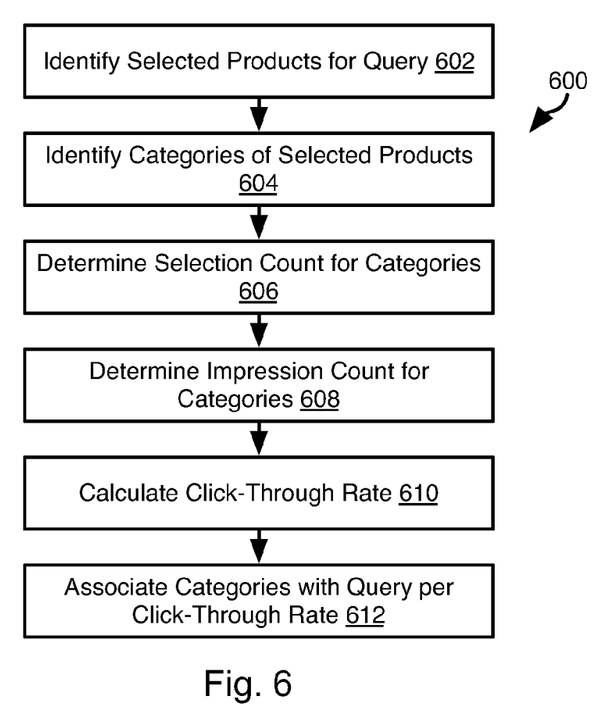
FIG. 6 is a process flow diagram of an alternative method for associating queries with a query cluster in accordance with an embodiment of the present invention.

FIG. 6 illustrates an alternative method 600 for identifying a category associated with a query, such as the head query of a cluster. The method 600 may be executed with respect to a query and take as additional inputs query results for various times in which the query has been input and user selections for the query results.

The method 600 may include identifying 602 product records selected for the one or more instances in which the query was input by a user or any of a number of users. For these product records, categories associated therewith may be identified 604. As noted above, where the product records are associated with a taxonomy, the categories of the product records may be ancestor nodes (e.g. categories and subcategories) of the product records in the taxonomy. Categories for a product record, or other document, may also be determined based on an explicit listing of such categories or by inferring categories based on the content of the product record.

For the identified 604 categories, a selection count may be determined 606 or retrieved. The selection count for a category may include a count of a number of times a product record belonging to the category was selected for the query that is the subject of the method 600. In some embodiments, the selection count may include a count of a number of times other, e.g. all other, product records belonging to the category were selected from among search results for any query of a user for which the methods herein are executed or a collection of users for which query data is used.

An impression count 608 for the categories associated with the identified 602 categories may also be determined 608 or retrieved. An impression count for a category may be the number of times a product record belonging toe the category was included in search results for the query that is the subject of the method 500. In some embodiments, the impression count for a category only counts as an impressions instances when a product record belonging to the category was included in the search result and was actually viewed by a user, e.g. transmitted as part of a web page rendered on a display device on a customer computing device 106 or other document representing the search results. The impression count determined 608 or retrieved for a category may include an impression count for product records belonging to the category including a number of times these product records were included in search results for queries other than the query that is the subject of the method 600.

A click-through rate for the identified 604 categories may then be calculated 610 based on the determined 608 number of selections (e.g. clicks) and the determined 610 impression count. In a simple case, the click-through rate for category is proportional to the selection count divided by the impression count.

Categories may then be associated 612 with the query that is the subject of the method 600. For example, the top N identified 604 categories with the highest click-through rate may selected as the categories associated 612 with the query that is the subject of the method 600. In some embodiments, click-through rates for categories may be known, such as by performing steps 606-610, at some point prior to receiving invocation of the method 600, such that only step 612 is performed post-invocation.

Figure 7:
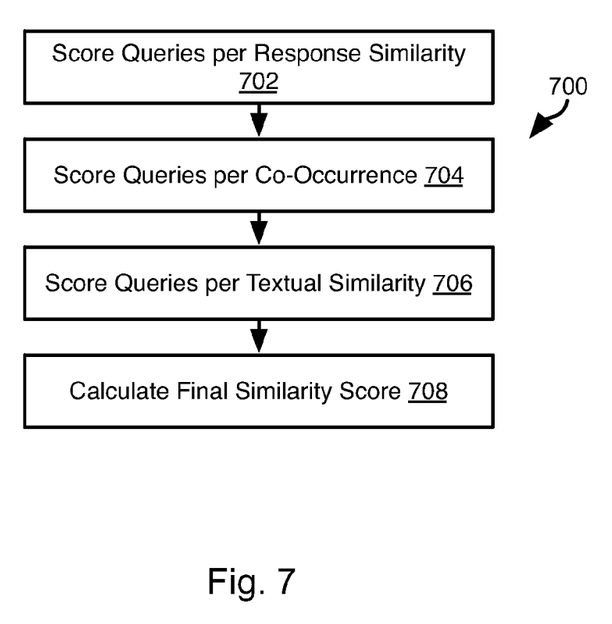
FIG. 7 is a process flow diagram of a method for assigning similarity scores to queries in accordance with an embodiment of the present invention.

FIG. 7 illustrates a method 700 that may be executed to determine the similarity between queries $q_1$ and $q_2$, such as between a secondary query and a head query or any other pair of queries.

The method 700 may include scoring 702 the queries according to response similarity. For example, $P_n$ may be defined as a vector of values having as entries $P_n[i]$ thereof a number of times a product i was clicked, or otherwise selected, by a user from among search results returned in response to the query $q_n$. A response similarity score may be based on the similarity of the vectors $P_1$ and $P_2$ for $q_1$ and $q_2$.

Any measure of similarity, such as a dot product or correlation may be used. In one embodiment, response similarity is calculated according to (1) or derived from the output of (1)

$$\text{Score} = \frac{P_1 \cdot P_2}{\sqrt{|P_1|^2} \sqrt{|P_2|^2}} \quad (1)$$

The queries $q_1$ and $q_2$ may also be scored 704 according to co-occurrence. In a typical browsing situation, a user may invoke display of a merchant website on a customer workstation 106 and enter a number of queries into a search field thereof before navigating away from the website. The period of time between requesting display of the merchant website and navigating away from the merchant website, closing a browser displaying the merchant website, or other action that ends display of the merchant website, may be deemed a session. A session and actions occurring during a session may be reported by code executing in association with the merchant website executing on a customer workstation 106. A session may also be detected by the server system 102 or a webserver operated on behalf of the entity owning or controlling the server system 102 based on communications received form the customer workstation, or using any other method known in the art for detecting user interaction with a website.

Scoring queries according to co-occurrence similarity may include assigning a score to the queries $q_1$ and $q_2$ according to a frequency with which the queries $q_1$ and $q_2$ occur in the same session. For example, (2) or some other value based on freq $(q_1, q_2)$, where freq$(q_1, q_2)$ is a number of times that $q_1$ and $q_2$ occur together in search a session and freq$(q_n)$ is a frequency with which $q_1$, occurs in any session. The values of freq$(q_1, q_2)$ and freq$(q_n)$ may be a raw count of co-occurrence and occurrence, respectively.

$$\text{Score} = \frac{freq(q_1, q_2)}{freq(q_1) + freq(q_2)} \quad (2)$$

The method 700 may further include scoring 706 textual similarity between $q_1$ and $q_2$. Textual similarity may be evaluated using any metric of textual similarity, such as edit distance, including any algorithm for calculating the edit distance between strings of text or array of tokens. The queries $q_1$ and $q_2$ may be processed prior to scoring textual similarity, such as by performing one or both of query normalization and query stemming.

Two or more of the above scores may then be combined to calculate 708 a final score. Combination may include summing, averaging, weighting, and summing, multiplying, or any other mathematical function based on two or more of the above-mentioned similarity scores.

In some embodiments, a logistic regression model is used to combine two or more similarity scores using (3), where Score(i) is any one of the similarity scores described above, and $w_1$ is a weight assigned to that score and $w_0$ is a constant that may be zero. The weights $w_0$,wi may be calculated using logistic regression or some other machine-learning method based on training data, such as training data generated according to human judgment. For example, training data may include entries including pairs of queries known to be synonymous or determined by human judgment to correspond to the same product records as inputs and a high similarity score as an output. Training data may also include pairs of queries that are different from one another and a low similarity score associated therewith.

$$FinalScore(Q_1, Q_2) = \frac{1}{1 + e^{-w_0 - \Sigma Score(i) * w_i}} \quad (3)$$

The final score for a pair of queries may have a magnitude that increases with a degree of similarity between the queries. In order to adapt the similarity score for use in a clustering algorithm a "distance" between queries may be calculated, where the distance decreases with the degree of similarity. For example, the distance D between queries $q_1$ and $q_2$ for use in clustering of queries as described above may be calculated according to $D(q_1, q_2) = 1 - FinalScore(q_1, q_2)$.

Figure 8:
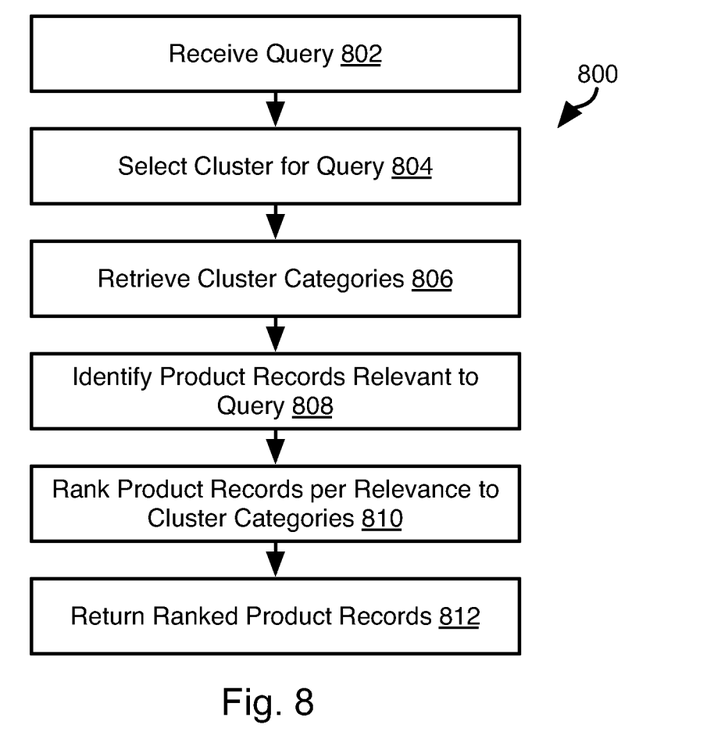
FIG. 8 is a process flow diagram of a method for responding to a query using clustered queries in accordance with an embodiment of the present invention.

FIG. 8 illustrates a method 800 for responding to a query using query clusters and associated information generated according to the methods described hereinabove. The method 800 may be executed by a server system 102 or by some other entity with an interface provided to the server system 102.

The method 800 may include receiving 802 a query, such as from a customer computing device 106. The a query cluster may be selected 804 for the query. The cluster of any available query clusters may be chosen based on similarity of the received query to one or both of a head query of the cluster and a tail query of the cluster. Similarity of the received query to a query of a cluster may be determined using some or all of the similarity scores described above with respect to the method 700 of FIG. 7 or a combination thereof, such as also described for the method 700 of FIG. 7. For example, the cluster for which the received query has the largest mean similarity score with respect to one or both of the tail queries and head query may be selected, where the similarity score is calculated based on some or all of the similarity scores described above with respect to FIG. 7. In other embodiments, the cluster may be that which includes the tail query or head query that has the largest similarity score with respect to the received query. The categories associated with the selected 804 cluster may be retrieved 806 or calculated if not available, such as by using the methods of FIG. 5 or 6.

A plurality of products relevant to the received query may be identified 808. This may include submitting the received query to a search engine, including any search engine known in the art, and receiving a set of search results therefrom. In some embodiment, the received query may be augmented to include one or more of the cluster categories and this augmented query submitted to the search engine. In some embodiments, one or more words of the query may be replaced with, or augmented with, synonyms identified for the one or more words according to synonym mining as described above.

The product records identified 808 by searching may be ranked 810 according to the relevance of these product records to the cluster categories for the selected 804 cluster. For example, the more categories corresponding to a returned product record, the higher the rank of the product record. Where multiple records have equal relevance to the categories of the selected cluster, the relative rank of the records may be as output by the search engine.

Some or all of the product records identified 808 by the search engine may be returned 812 to a requesting entity, such as to a browser executing on a customer workstation 106. The returned product records may have a ranking according to the ranking step 810 associated therewith or may be listed in an order reflecting the ranking. In some embodiments, only the top N product records with the highest rankings are returned 812.

Figure 9:
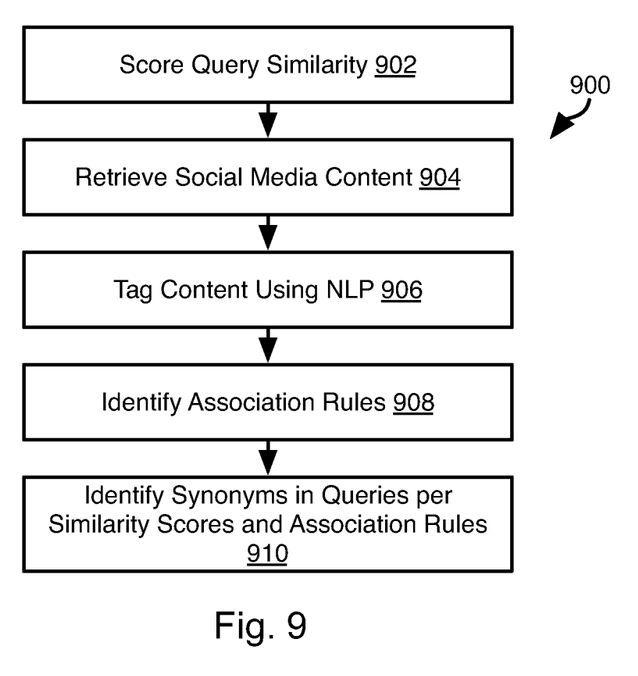
FIG. 9 is a process flow diagram of a method for identifying synonyms in accordance with an embodiment of the present invention.

FIG. 9 illustrates a method 900 for identifying synonyms. The method 900 may include scoring query similarities. This may include calculating 902 some or all of the similarity scores or the combination of similarity scores described above with respect to FIG. 7, including response similarity, co-occurrence similarity, and textual similarity. Where similarity scores have been calculated previously for purposes of clustering, these similarity scores for pairs of queries may be reused.

The method 900 may further include retrieving social media content 904. The retrieved social media content may be current social media content, such as content generated on Twitter™, Facebook™, FourSquare™, LinkedIn™, or other social networking platform. The social media content may include a sampling of social media content or some or all social media content generated in a window of time prior to a time that the retrieval step 904, such as an N month or N week window.

Documents among the retrieved 904 social media content may then be analyzed. Documents analyzed may include individual postings to a social media site or groups of documents forming a conversation. For example, documents may be tagged 906 using natural language processing (NLP) to identify parts of speech (noun, verb, adjective, etc.) associated with words in the documents. The documents as tagged may then be analyzed to identify 908 association rules 908. Association rules may include any textual pattern apparent among the tagged content.

As an example, association rules may be generated for pairs of words that co-occur above a threshold number of times or a threshold percentage of times that either word occurs. Co-occurrence of pairs of words may also be calculated according to (2) or any other metric of co-occurrence for the corpus of documents being analyzed. Where a pair of words has a co-occurrence metric above a threshold, an association rule may be generated indicating that one word is associated with the other. For example, the word "rock band" may be associated with "Beatles" by an association rule due to a version of the Rock Band video game with a Beatles theme. As another example "energy" may be associated with the phrase "red bull" because of Red Bull™ energy drink. The association rules may further be restricted to certain parts of speech, e.g. nouns or noun phrases. Where the methods described herein are executed with respect to product records, association rules may be limited to words describing a product or class of products. For example, co-occurrence rules for pairs of words may be limited to those where at least one word of the pair is a product name or colloquial version of a product name.

Any other pattern apparent among pairs of words or groups of words may be used to generate an association rule, such as proximity between pairs of words, co-occurrence of three or more words, co-occurrences of concepts associated with words, or the like.

Using the association rules identified 908 and the scored 902 pairs of queries, synonyms may be identified 910. Synonyms may be identified by applying rules to one or both of the association rules and similarity scores for query pairs. For example, one rule may state that where the textual similarity score of a pair of queries is above a threshold, one or more words unique to one query of the pair of queries should be deemed synonyms to one or more words unique to the second query of the pair. In some embodiments, a part of speech, if known for a word may be used to identify synonyms, e.g., where a first noun is found in one query and a second non-identical noun is found in the second query, the first and second nouns may be deemed synonyms if the textual similarity meets the threshold condition. In another example, association rules are used to identify synonyms. For example, where two queries have a threshold-exceeding similarity score (response, co-occurrence, textual similarity, or a combination thereof), the words of the queries may be identified those words that are associated with the same word according to an association rule may be identified as synonyms. That is to say, if word A in $q_1$ is associated with B according to an association rule and C in $q_2$ is associated with B in an association rule, then A and C may be deemed synonyms.

In some embodiments, a final score for the similarity of a pair of queries may be calculated using a logistic regression formula, such as (3), where one or more of the query similarity scores above are used. Where (3) is used to identify queries appropriate for the identification of synonyms, the weights $w_0$, $w_1$ may be the same or different as the weights used for clustering. Where a score according to (3) meets or exceeds a threshold condition, one or more words unique to a first query of a pair of queries may be deemed synonyms to one or more words unique to the second query, where unique words are those included in one query of the pair but not the other.

In some embodiments, mining synonyms may be more broadly viewed as identifying words that may be used to augment a query. Accordingly, where a pair of queries meet a threshold condition and comply with one or more rules for identifying synonyms, words unique to each query of the pair may be associated with one another as synonyms, such as according to one or more rules, and treated as such for the purposes of augmenting queries, though they may not strictly be synonyms.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for searching, the method comprising:
   receiving, by a computer system, first queries, from a user;
   selecting, by the computer system, a plurality of head queries from among the first queries;
   clustering, by the computer system, the first queries, exclusive of the plurality of head queries, to the plurality of head queries by:
      calculating similarity scores for at least a portion of the first queries relative to the plurality of head queries; and
      clustering the at least the portion of the first queries to the plurality of head queries according to the similarity scores;
   associating, by the computer system, one or more categories with each head query of the plurality of head queries;
   receiving, by the computer system, a second query;
   determining a similarity between the second query and at least one of a selected head query of the plurality of head queries;
   associating, by the computer system, the second query with the selected head query of the plurality of head queries according to the similarity between the second query and the at least one of the selected head query; and
   identifying, by the computer system, one or more documents relevant to the second query using the one or more categories associated with the selected head query of the plurality of head queries;
   wherein:
      calculating the similarity scores for the at least the portion of the first queries relative to the plurality of head queries further comprises:
         evaluating response similarity between user selections of search results for the at least the portion of the first queries and user selections of search results for the plurality of head queries by evaluating an equation:

$$Sim(q_1, q_2) = \frac{P_1 \cdot P_2}{\sqrt{|P_1|^2} \sqrt{|P_2|^2}}$$

where Sim $(q_1,q_2)$ is a similarity score of a first query $a_1$ of the at least the portion of the first queries, $q_2$ is a head query of the plurality of head queries, $P_1$ is a vector of user selection counts for search results of $q_1$, and $P_2$ is a vector of user selection counts for search results of $q_2$.

2. The method of claim 1, wherein calculating the similarity scores for the at least the portion of the first queries relative to the plurality of head queries further comprises:
   determining co-occurrences of the at least the portion of the first queries with the plurality of head queries in a same user session.

3. The method of claim 1, wherein calculating the similarity scores for the at least the portion of the first queries relative to the plurality of head queries further comprises evaluating textual similarity of the at least the portion of the first queries to the plurality of head queries.

4. The method of claim 1, wherein calculating the similarity scores for the at least the portion of the first queries relative to the plurality of head queries further comprises:
   calculating first scores according to the response similarity between user selections of the search results for the at least the portion of the first queries and user selections of the search results for the plurality of head queries;
   calculating second scores according to co-occurrences of the at least the portion of the first queries with the plurality of head queries in a same user session;
   calculating third scores according to textual similarity of the at least the portion of the first queries to the plurality of head queries; and
   calculating the similarity scores for the at least the portion of the first queries according to a combination of the first, second, and third scores.

5. The method of claim 1, wherein selecting, by the computer system, the plurality of head queries from among the first queries further comprises:
   selecting, as the plurality of head queries, those queries of the first queries having highest click-through rates for search results associated therewith.

6. The method of claim 1, further comprising evaluating the first queries to identify synonyms according to the clustering of the first queries, exclusive of the plurality of head queries, to the plurality of head queries.

7. The method of claim 6, further comprising modifying the second query according to the identified synonyms.

8. A system for searching, the system comprising one or more processors and one or more memory devices coupled to the one or more processors, the one or more memory devices storing executable and operational data effective to cause the one or more processors to:
   receive first queries, from a user;
   select a plurality of head queries from among the first queries;

cluster the first queries, exclusive of the plurality of head queries, to the plurality of head queries by:
calculating similarity scores for at least a portion of the first queries relative to the plurality of head queries by evaluating response similarity between user selections of search results for the at least the portion of the first queries and user selections of search results for the plurality of head queries, by evaluating an equation:

$$Sim(q_1, q_2) = \frac{P_1 \cdot P_2}{\sqrt{|P_1|^2} \sqrt{|P_2|^2}}$$

where Sim ($q_1$, $q_2$) is a similarity score of a first query $q_1$, of the at least the portion of the first queries, $q_2$ is a head query of the plurality of head queries, $P_1$ is a vector of user selection counts for search results of $q_1$, and $P_2$ is a vector of user selection counts for search results of $q_2$; and
clustering the at least the portion of the first queries to the plurality of head queries according to the similarity scores;
associate one or more categories with each head query of the plurality of head queries;
receive a second query;
determine a similarity between the second query and at least one of a selected head query of the plurality of head queries;
associate the second query with the selected head query of the plurality of head queries according to the similarity between the second query and the at least one of the selected head query; and
identify one or more documents relevant to the second query using the one or more categories associated with the selected head query of the plurality of head queries.

9. The system of claim 8, wherein the executable and operational data are further effective to cause the one or more processors to calculate the similarity scores for the at least the portion of the first queries relative to the plurality of head queries by determining co-occurrences of the at least the portion of the first queries with the plurality of head queries in a same user session.

10. The system of claim 8, wherein the executable and operational data are further effective to cause the one or more processors to calculate the similarity scores for the at least the portion of the first queries relative to the plurality of head queries by evaluating textual similarity of the at least the portion of the first queries to the plurality of head queries.

11. The system of claim 8, wherein the executable and operational data are further effective to cause the one or more processors to calculate the similarity scores for at least the portion of the first queries relative to the plurality of head queries by:
calculating first scores according to the response similarity between user selections of the search results for the at least the portion of the first queries and user selections of the search results for the plurality of head queries;
calculating second scores according to co-occurrences of the at least the portion of the first queries with the plurality of head queries in a same user session;
calculating third scores according to textual similarity of the at least the portion of the first queries to the plurality of head queries; and
calculating the similarity scores for the at least the portion of the first queries according to a combination of the first, second, and third scores.

12. The system of claim 8, wherein the executable and operational data are further effective to cause the one or more processors to select the plurality of head queries from among the first queries by:
selecting, as the plurality of head queries, those queries of the first queries having highest click-through rates for search results associated therewith.

13. The system of claim 8, wherein the executable and operational data are further effective to cause the one or more processors to evaluate the first queries to identify synonyms according to the clustering of the first queries, exclusive of the plurality of head queries, to the plurality of head queries.

14. The system of claim 13, wherein the executable and operational data are further effective to cause the one or more processors to modify the second query according to the identified synonyms.

* * * * *